Patented Sept. 12, 1950

2,521,675

UNITED STATES PATENT OFFICE 2,521,675

INTERPOLYMERIZATION OF STYRENE, ALPHA-METHYLSTYRENE, AND OXIDIZED SOYABEAN OIL

Harold M. Hoogsteen, Midland, Mich., assignor to The Dow Chemical Company, Midland, Mich., a corporation of Delaware No Drawing. Application February 21, 1949, Serial No. 77,685

5 Claims. (Cl. 260—23)

1

This invention concerns an improved method of interpolymerizing styrene, alpha-methylstyrene and partially oxidized soyabean oil to form polymeric materials suitable for use as varnish resins. It also concerns the resins made by this method. It pertains especially to varnish resins which, when dried by exposure to air, have good resistance to the solvent action of aliphatic hydrocarbons.

In my copending application, Serial No. 10,916, filed February 25, 1948, of which this is a continuation-in-part, it is disclosed that toluene-soluble varnish resins may be prepared by polymerizing mixtures of styrene, alpha-methylstyrene, and drying oils which have been preoxidized, but which when in raw, i. e. non-oxidized, condition are unconjugated or of a fairly low degree of conjugation between the olefinic linkages thereof. The resins thus prepared may be dissolved in usual varnish solvents and cast as films which dry to form tack-free coatings. Pigments may be added to the varnishes to obtain enamels which may similarly be spread and dried to a tack-free condition. During drying of the films, there occurs not only vaporization of the solvent, but further oxidation and resultant hardening of the resin, i. e. the resin itself undergoes "drying" upon standing under exposure to air.

In accordance with conventional practice, paint driers are usually added to the varnish and enamel compositions of said copending application to accelerate the drying action. The copending application also discloses, but does not specifically claim, polymerization of mixtures of styrene, alpha-methylstyrene, pre-oxidized drying oils and paint driers, the latter being present during the polymerization reaction for formation of varnish resins.

I have observed that the resins made by polymerizing mixtures of styrene, alpha-methylstyrene and preoxidized soyabean oil in the absence of a paint drier form varnish films which, after being dried on a base member, e. g. a metal panel, are readily loosened from the supporting surface upon becoming wetted with liquid aliphatic hydrocarbons such as gasoline, fuel oil, or other petroleum fractions. However, I have found that by having a paint drier present in the mixture which is polymerized to form such resin, the latter is modified so that when made into a varnish, and spread on a supporting surface, and dried, the resultant film is far more resistant to loosening from the supporting surface by the action of aliphatic hydrocarbon liquids than when the drier

2 is omitted during formation of the resin. This effect of a drier is not obtained to an appreciable extent when the drier is omitted during formation of the resin, but added afterward, i. e. it is important that the drier be present during the polymerization reaction to form the resin. Also, this action of a paint drier appears to be peculiar to the afore-mentioned interpolymers of pre-oxidized soyabean oil. For instance, the addition of paint driers to mixtures of styrene, alpha-methylstyrene and pre-oxidized linseed oil prior to polymerization to form a resin has not improved appreciably the resistance of dried varnish films of the resin to loosening from a supporting base member by the action of liquid aliphatic hydrocarbons. Fortunately, dried films of such interpolymers of oxidized linseed oil inherently possess good resistance to the above-described loosening, or solvent, action of liquid aliphatic hydrocarbons.

The discovery that the resistance of dried varnish films of the aforementioned oxidized soyabean oil interpolymers, to the loosening action of liquid petroleum fractions, may be improved by preparing the resin in admixture with a paint drier is of importance, since it permits the production from soyabean oil of varnish resins which are adapted for use in coating compositions for automobiles, machine parts, etc., where the coated surfaces may occasionally become wetted with gasoline or other liquid fractions of petroleum.

The invention pertains to the preparation of such oxidized soyabean oil interpolymers which, after being dissolved in a solvent to form a varnish, applied as a film to a solid base member, and dried, are resistant to the action of liquid aliphatic hydrocarbons in causing loosening of the dried varnish from its supporting base member.

In preparing a varnish resin in accordance with the invention, a mixture comprising pre-oxidized soyabean oil, styrene, alpha-methylstyrene and a minor amount of a paint drier is polymerized. The polymerization may be carried out in the presence or absence of a solvent, e. g. benzene, toluene, xylene, or chlorobenzene, etc., and with or without the aid of a polymerization catalyst. It is preferably carried out en masse using an organic peroxide to catalyze the reaction.

The oxidized soyabean oil may be prepared by blowing raw soyabean oil with air, oxygen, or other oxygen-containing gas under the conditions usual in preparing blown drying oils. Usually, the oxidation is accomplished by blowing air through the oil while heating the latter at temperatures of from 100° to 150° C., but it may be accomplished at lower or higher temperatures, e. g. at from 50° to 300° C. The oxidation causes an increase in the number of peroxide groups in the oil and is accompanied by an increase in the viscosity of the oil. Oxidation is continued until the oil contains chemically combined oxygen in amount exceeding by at least 10, and usually from 12 to 70, per cent the initial oxygen content of the soyabean oil. It is preferably continued until the oil contains from 16.3 to 18.5 per cent by weight of chemically combined oxygen; has a peroxide value of at least 80, e. g. from 80 to 500; and has a Gardner-Holdt viscosity of from Z—2 to Z—6. These preferred oxygen-content values exceed that of raw soyabean oil by from 45 to 60 per cent or thereabout. The peroxide values herein mentioned are 1000 times the number of gram moles of peroxide per thousand grams of oil, as determined by the method of Wheeler, Oil and Soap, 9 89–97 (1932). When adding a peroxide catalyst in polymerizing a mixture of air-blown soyabean oil, styrene and alpha-methylstyrene, the blown oil may have a peroxide value far lower than the values just mentioned, but it preferably has an oxygen content and a viscosity within the limits just given.

Any of the various drying oil-soluble metal salts commonly employed as paint driers may be employed in the polymerization mixtures of this invention. Examples of such driers are the resinates and naphthenates of lead, cobalt, manganese, zinc and calcium. A cobalt or manganese drier is usually employed. The drier is usually employed in amount such that its metal-content corresponds to between 0.005 and 0.10 per cent of the combined weight of the styrene, alpha-methylstyrene and pre-oxidized soyabean oil to be interpolymerized, but it may be used in smaller or greater proportions.

The mixture of polymerizable starting materials contains from 20 to 80, preferably from 40 to 70, per cent by weight of the partially oxidized soyabean oil, the remainder of the polymerizable material being styrene and alpha-methylstyrene. The alpha-methylstyrene is present in amount corresponding to from 10 to 40, preferably from 10 to 30, per cent of the combined weight of the same and the styrene. Within the limits just stated, an increase in the proportions of the alpha-methylstyrene results, under otherwise similar polymerization conditions, in a lowering of the average, i. e. the measured, molecular weight of the interpolymer which is formed. Dissolved together with the polymerizable starting materials is a paint drier in the aforestated proportion. A minor amount, e. g. from 0.1 to 5 per cent by weight, of a polymerization catalyst such as benzoyl peroxide or acetyl peroxide, etc., may be added, but is not required. An inert solvent for the reactants, e. g. benzene or xylene, etc., may be added as a reaction medium, but is preferably omitted. The several starting materials in the proportions just given may be admixed in any order.

The polymerization may be carried out in an open vessel under exposure to air, but is preferably accomplished in a closed vessel, e. g. an autoclave, so as to minimize discoloration during formation of the interpolymer. The polymerization is preferably accomplished by heating the mixture at temperatures in the order of from 100° to 150° C. for an hour or more and gradually raising the temperature, e. g. to 200°–300° C. as the polymerization proceeds, but it may be carried out at a constant temperature. The time required for completion of the reaction is dependent on the polymerization temperatures employed and the presence or absence of a polymerization catalyst, but is usually in the order of from 4 to 30 hours.

After completion of the reaction, the polymeric product is preferably freed of any unpolymerized styrene or alpha-methylstyrene, since such monomeric material, if permitted to remain, lends an objectionable odor to the product. The unpolymerized material is readily vaporized from the interpolymer in usual ways, e. g. by treatment with steam or preferably by heating the product under vacuum.

The interpolymers thus prepared are gummy or resinous materials readily soluble in aromatic liquids such as benzene, toluene, or xylene and in other paint and varnish solvents. They may be stored or shipped in closed containers to protect them from the action of air, and when desired may be dissolved in such solvents to form varnishes. The varnishes dry rapidly to form tack-free hard films which adhere well to the supporting surface, e. g. of wood, iron, or steel, etc., on which they are formed and which are quite resistant to the solvent action of gasoline and other liquid petroleum fractions in causing loosening of the dried varnish films. The dried varnish films are of good appearance and durability and in most instances of good flexibility. By adding pigments and other usual ingredients to the varnishes, paints and enamels of good quality may be prepared. The coating compositions just mentioned may be applied in usual ways, e. g. by brushing, dipping, or spraying, to surfaces of wood, metal, paper, or cloth, etc., to form films which dry rapidly at room temperature. During drying, the interpolymer apparently undergoes oxidation by air to form a hard, tack-free coating.

The following examples describe a number of ways in which the invention has ben practiced, and illustrate certain of its advantages, but are not to be construed as limiting the invention.

EXAMPLE 1

In each of two experiments, 35 parts by weight of styrene and 15 parts of alpha-methylstyrene was admixed with 50 parts of air-blown soyabean oil. The experiments differed from one another, in that the air-blown soyabean oil employed in one experiment contained 16.8 per cent by weight of chemically combined oxygen, had a peroxide value of 80, and was free of paint driers, whereas the air-blown soyabean oil used in the other experiment had a peroxide value of 248 and contained a manganese drier in amount comprising 0.01 per cent by weight of manganese. Each mixture was polymerized by heating the same with stirring at a temperature of 175° C. for 24 hours. Each resultant polymeric product was a clear gummy resin when cooled to room temperature. A weighed portion of each product was heated at a temperature of 105° C. for 6 hours to vaporize therefrom any unpolymerized styrene, or alpha-methylstyrene, or other volatile component, and was thereafter reweighed. The per cent loss in weight is expressed in the table as per cent of volatile material in the product. Another portion of each product was admixed with an equal weight of a solution consisting of 70 per cent by volume of mineral spirits, boiling over a range of from 155° to 210° C. at 760 millimeters absolute pressure, and 30 per cent of Solvesso No. 2 (a petroleum fraction containing more than 90 per cent by weight of aromatic hydrocarbons such as toluene, xylene, etc., and boiling at from 132° to 177° C. at atmospheric pressure). A paint drier consisting of lead and cobalt naphthenates and containing, as such naphthenates, 0.5 per cent of lead and 0.02 per cent of cobalt, based on the weight of the dissolved polymer, was added. Each varnish was tested by dipping glass plates in the same, removing the plates and allowing the varnish to dry and cure by standing at room temperature. From time to time a finger was pressed against the varnish and withdrawn. The minutes of standing after application of the varnish film till the latter did not string out on withdrawing the finger is given in the following table as the time of drying to the touch, and the minutes of standing after application of the varnish until no fingerprint was left after pressing the varnish film is given as the time of drying to hardness. After standing at room temperature for three days, plates coated with the respective varnishes were immersed in Troluoil (a petroleum fraction rich in aliphatic hydrocarbons and boiling over a range of from about 94° to about 122° C.). At timed intervals each plate was inspected to see if the varnish had separated therefrom. If not, the varnish layer was stroked gently with a finger tip to see if that would cause separation of the varnish from the plate. Occurrence of separation of varnish from the plate on which it was deposited was considered to be a failure of the varnish film. The time of immersion in Troluoil until the film failed, either spontaneously or when stroked with a finger, was determined. This test, which is referred to as the "Troluoil test" is a measure of the usefulness of varnishes which, after application, may be contacted with gasoline or other petroleum fractions. Other glass plates which had been coated with the respective varnishes and then permitted to stand at room temperature for five days, were tested for hardness of the varnish films by the Sward Rocker method described on pages 296–300 of the eighth edition of Gardner's book "Paints, Varnishes, Lacquers and Colors," published in 1937 by the Institute of Paint and Varnish Research, Washington, D. C. The hardness values thus determined are given in the table. A film of each varnish was similarly applied to a tin plate and, after standing for one week, the plate was tested to determine the flexibility of the cured varnish film thereon. The test was by bending the plate over a conical mandrel and observing whether cracks developed in the varnish film, the procedure being similar to that described in A. S. T. M. D522–41 as a test for elongation of attached films. Films of both of the above-mentioned varnishes withstood this test without developing cracks, i. e. they possessed good flexibility. Table I identifies each polymeric product by indicating whether a paint drier was present during formation of the same. It also gives the per cent by weight of volatiles in each interpolymerization product; the Gardner-Holdt viscosity of the varnish prepared from said product; the minutes of drying time to touch and to hardness of films of each varnish; the Sward hardness value for a cured film of each varnish; and the hours of immersion in Troluoil which plates coated with the respective cured-varnishes withstood before the varnish peeled readily from the plate.

*Table 1*

| Run No. | Polymeric Product | | Properties of Varnish | | | | |
|---|---|---|---|---|---|---|---|
| | Formed in Presence of Drier | Per Cent Volatiles | Viscosity | Minutes of Drying to— | | Sward Hardness | Troluoil Test, Hours Till Film Fails |
| | | | | Touch | Hardness | | |
| 1 | No | 2.4 | J | 5 | 14 | 15 | 0.9 |
| 2 | Yes | 1.7 | E | 13 | 360 | 12 | >48 |

EXAMPLE 2

In each of two experiments a mixture of 55 parts by weight of partially oxidized, i. e. air-blown, soyabean oil, 31.5 parts of styrene, and 13.5 parts of alpha-methylstyrene was polymerized by heating the same at 175° C. for 24 hours. One of the polymerization reactions was carried out in the absence of paint driers, but cobalt naphthenate in amount containing 0.022 part by weight of cobalt was initially dissolved in the other polymerization mixture and was present during the polymerization. The oxidized soyabean oil used in the two experiments was from the same batch, and therefore was of identical quality. After completing the polymerization reaction, the proportion of volatile components in each product was determined by heating a weighed sample of the same at 110° C. for six hours and then reweighing. Two varnishes, each containing 50 per cent by weight of one of the polymeric products and also containing an added lead naphthenate drier and an added cobalt naphthenate drier, were prepared from other portions of the respective poylmeric products. The procedure, and the kinds and proportions of solvents employed in preparing each varnish, were as given in Example 1. Each varnish was tested to determine its Gardner-Holdt viscosity. Also, glass plates were dipped in the respective varnishes, removed, and the varnish films were dried by permitting the plates to stand at room temperature. The time of drying to touch and to hardness were determined as in Example 1. Each dried varnish film was examined for clarity. Five days after applying the varnish, the Sward hardness values of dried films of the respective varnishes were determined. Three days after applying the varnishes, plates coated therewith were tested for resistance to Troluoil, as in Example 1. Table II identifies the polymeric material employed in each varnish by stating whether a drier was present during formation of the polymer. It also gives the per cent by weight of volatile components in each interpolymer, and the results of the several above tests on varnish prepared from the interpolymer.

Table II

| Run No. | Polymeric Product | | Properties of Varnish | | | | | |
|---|---|---|---|---|---|---|---|---|
| | Drier Present When Formed | Per Cent Volatiles in— | Viscosity | Drying Time to— | | Clarity of Dried Film | Sward Hardness Per Cent | Troluoil Test, Time Till Film Failed |
| | | | | Touch, Minutes | Hardness, Minutes | | | |
| 1 | No | 2.4 | I | 15 | 180 | Hazy | 9 | 2 minutes. |
| 2 | Yes | 1.9 | U | 15 | 120 | Clear | 21 | >24 hours. |

EXAMPLE 3

Glass plates which had been coated with the varnishes of Example 2 and permitted to stand for five days were tested to determine the resistance of the cured varnish films to the solvent action of mixtures of liquid aliphatic and aromatic hydrocarbons. Plates coated with the respective varnishes were immersed in a mixture of 95 per cent Troluoil and 5 per cent toluene, by volume, and the plates were examined at timed intervals to find whether the varnish peeled readily therefrom either spontaneously or upon gentle stroking of the varnish with a finger. Similar tests were carried out using other Troluoil-toluene mixtures. The results of the tests are given in Table III which identifies each varnish by stating whether its resin component was formed in the presence of a paint drier. The table identifies each solvent mixture by giving the per cent by volume of toluene therein. It states the time of immersion in a solvent mixture prior to loosening of the varnish on a test plate. The maximum time of immersion was 72 hours. In instances in which film failure did not occur, the time till failure is given as greater than 72 hours.

Table III

| Run No. | Resin Formed in Presence of Drier | Time of immersion prior to film failure in mixed solvent containing— | | | |
|---|---|---|---|---|---|
| | | 5% Toluene | 10% Toluene | 20% Toluene | 30% Toluene |
| 1 | No | 5 min | 2 min | 2 min | 1 min. |
| 2 | Yes | >72 hrs | >72 hrs | >72 hrs | 9 min. |

EXAMPLE 4

In each of two experiments, a mixture of 52 parts by weight of partially oxidized, i. e. airblown, soyabean oil, 33.6 parts of styrene, and 14.4 parts of alpha-methylstyrene was polymerized by heating the same with stirring at 125° C. for 3 hours, then at 175° C. for 3 hours, and finally at 250° C. for 1 hour. The experiments differed, in that one polymerization was carried out in the absence of paint driers, whereas manganese naphthenate, in amount containing 0.02 part by weight of manganese, was initially dissolved in the other polymerization mixture. The oxidized soyabean oil used in both reactions was from the same batch and was of identical quality. The polymeric products were tested for per cent volatile content, and were made into varnishes of fifty per cent by weight polymer content and each varnish was tested, as in Example 2. Table IV identifies each polymeric product by indicating whether a drier was present during formation of the product. It also gives the Gardner-Holdt viscosity of the varnish prepared from each varnish, the drying times at room temperature, to touch and to hardness, of films of the respective varnishes on glass plates, the Sward hardness values of the cured films, and the periods over which plates coated with the cured films were immersed in Troluoil, before the films became loosened so that they peeled readily from the plates.

Table IV

| Run No. | Polymeric Product | | Properties of Varnish | | | | | |
|---|---|---|---|---|---|---|---|---|
| | Drier Present When Formed | Per Cent Volatiles in— | Viscosity | Drying Time to— | | Clarity of Dried Film | Sward Hardness, Per Cent | Troluoil Test, Time Till Film Failed |
| | | | | Touch, Minutes | Hardness, Minutes | | | |
| 1 | No | 1.5 | I | 15 | 210 | Hazy | 5 | 2 minutes. |
| 2 | Yes | 1.3 | L | 12 | 120 | Clear | 15 | >24 hours. |

EXAMPLE 5

Glass plates which had been coated with the varnishes of Example 4 and permitted to stand for five days were tested to determine the resistance of the cured varnish films to the solvent action of mixtures of liquid aliphatic and aromatic hydrocarbons. Plates coated with the respective varnishes were immersed in a mixture of 95 per cent Troluoil and 5 per cent toluene, by volume, and the plates were examined at timed intervals to find whether the varnish peeled readily therefrom either spontaneously or upon gentle stroking of the varnish with a finger. Similar tests were carried out using Troluoil-toluene mixtures of other compositions. The results of the tests are given in Table V which identifies each varnish by stating whether its resin component was formed in the presence of a paint drier. The table identifies each solvent mixture by giving the per cent by volume of toluene therein. It states the time of immersion in a solvent mixture prior to loosening of the varnish on a test plate. The maximum time of immersion was 72 hours. In instances in which film failure did not occur, the time till failure is given as greater than 72 hours.

Table V

| Run No. | Resin Formed in Presence of Drier | Time of immersion prior to film failure in mixed solvent containing— | | |
|---|---|---|---|---|
| | | 5% Toluene | 10% Toluene | 20% Toluene |
| 1 | No | 5 min | 2 min | 2 min |
| 2 | Yes | >72 hrs | >72 hrs | 11 min |

Other modes of applying the principle of the invention may be employed instead of those explained, change being made as regards the method or products herein disclosed, provided the steps or substances stated by any of the following claims, or the equivalent of such stated steps or substances, be employed.

I claim:

1. A method which comprises polymerizing together at temperatures between 100° and 300° C. from 20 to 80 parts by weight of air-blown soyabean oil, containing from 16.3 to 18.5 per cent by weight of chemically combined oxygen, and a total of from 80 to 20 parts of styrene and alpha-methylstyrene in relative proportions such that the proportion of the alpha-methylstyrene corresponds to between 10 and 40 per cent of the combined weight of the same and the styrene, while having a metal salt paint drier dissolved in the polymerization mixture.

2. A method, as described in claim 1, wherein the alpha-methylstyrene is in a proportion corresponding to between 10 and 30 per cent of the combined weight of the same and the styrene, and wherein the metal salt paint drier is in a proportion such that its metal content corresponds to between 0.005 and 0.1 per cent of the combined weight of the polymerizable materials.

3. A method, as claimed in claim 2, wherein the paint drier is cobalt naphthenate.

4. A method, as claimed in claim 2, wherein the paint drier is manganese naphthenate.

5. A varnish resin formed by interpolymerizing styrene, alpha-methylstyrene and air-blown soyabean oil in the presence of a paint drier in accordance with the method of claim 1.

HAROLD M. HOOGSTEEN.

REFERENCES CITED

The following references are of record in the file of this patent:

UNITED STATES PATENTS

| Number | Name | Date |
|---|---|---|
| 2,468,748 | Griess et al. | May 3, 1949 |